United States Patent
Liu (10) Patent No.: US 7,869,545 B2
(45) Date of Patent: Jan. 11, 2011

(54) CHANNEL ESTIMATION METHOD AND APPARATUS DETERMINING A CHANNEL IMPULSE RESPONSE (CIR) DISTRIBUTION AREA USING TWO ADJACENT WINDOWS

(75) Inventor: Guanghui Liu, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 889 days.

(21) Appl. No.: 11/752,394

(22) Filed: May 23, 2007

(65) Prior Publication Data

US 2008/0137525 A1 Jun. 12, 2008

(30) Foreign Application Priority Data

Dec. 7, 2006 (KR) .................. 10-2006-0123523

(51) Int. Cl.
H04L 27/06 (2006.01)
(52) U.S. Cl. .................................... 375/340
(58) Field of Classification Search .................. 375/340
See application file for complete search history.

(56) References Cited

U.S. PATENT DOCUMENTS

| 7,394,865 B2 * | 7/2008 | Borran et al. ................ 375/295 |
| 2004/0165674 A1 | 8/2004 | Huang |
| 2005/0008088 A1 | 1/2005 | Liu et al. |
| 2006/0062333 A1 * | 3/2006 | Yan ............................ 375/340 |

FOREIGN PATENT DOCUMENTS

KR        1020050011258        1/2005

* cited by examiner

*Primary Examiner*—Don N Vo
(74) *Attorney, Agent, or Firm*—F.Chau & Associates, LLC (57) ABSTRACT

A channel estimation method and apparatus based on two adjacent windows. The channel estimation method includes scanning a signal containing noise and channel impulse response (CIR) information with a first window and a second window, detecting a CIR distribution area based on the ratio between the average power of the signal within the first window and the average power of the signal within the second window and at least one threshold value, eliminating the noise from the CIR distribution area and estimating the CIR information. Accordingly, noise interference can be minimized and accurate channel estimation can be accomplished.

21 Claims, 8 Drawing Sheets

CHANNEL ESTIMATION METHOD AND APPARATUS DETERMINING A CHANNEL IMPULSE RESPONSE (CIR) DISTRIBUTION AREA USING TWO ADJACENT WINDOWS

CROSS-REFERENCE TO RELATED PATENT APPLICATION

This application claims priority under 35 U.S.C. §119 from Korean Patent Application No. 10-2006-0123523, filed on Dec. 7, 2006, the disclosure of which is hereby incorporated by reference herein as if set forth in its entirety.

FIELD OF THE INVENTION

The present invention relates to an orthogonal frequency division multiplexing (OFDM) communication system, and more particularly, to a channel estimation method and apparatus for determining a channel impulse response (CIR) distribution based on characteristics of two adjacent signal windows in a receiver in an orthogonal frequency division multiplexing (OFDM) communication system.

BACKGROUND OF THE INVENTION

Orthogonal frequency division multiplexing (OFDM) is a wideband modulation scheme in which a frequency bandwidth allocated for a communication session is divided into a plurality of narrow band frequency sub-bandwidths. Each narrow band frequency sub-bandwidth includes a radio frequency (RE) subcarrier. Subcarriers in different sub-channels are mathematically orthogonal to each other.

OFDM is a multi-carrier modulation scheme involving converting data to be transmitted into an M-ary quadrature amplitude modulation (QAM) complex symbol, converting a complex symbol sequence into a plurality of parallel complex symbols through serial-to-parallel conversion, and performing rectangular pulse shaping and subcarrier modulation of each parallel complex symbol. In the multi-carrier modulation, a frequency interval between subcarriers is set such that all of the subcarrier modulated parallel complex symbols are orthogonal to each other. Accordingly, OFDM allows the individual spectrums of subcarriers to overlap without inter-carrier-interference (ICI). This is due to the orthogonality of the subcarriers and also allows a high data transmission rate and high bandwidth use efficiency since a frequency bandwidth is divided into a plurality of orthogonal sub-bandwidths.

In data transmission systems (e.g., cyclic prefix (CP)-OFDM or time domain synchronous (TDS)-OFDM systems) using OFDM, a receiver identifies the characteristics of a channel by estimating a channel impulse response (CIR) while estimating the channel based on a known data signal transmitted from a transmitter. However, in addition to the transmitted information used to estimate the CIR, the received signal may also include noise such as adjacent channel interference or white Gaussian noise, which may make channel estimation difficult.

Figure 1A:
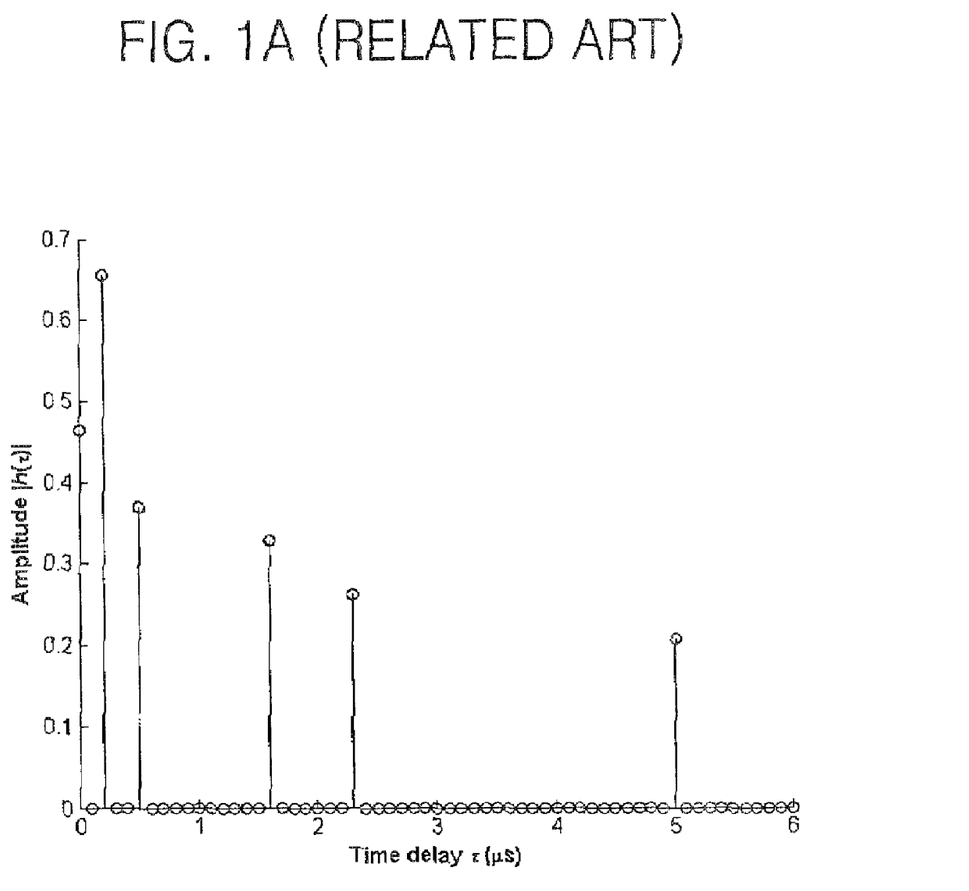
FIGS. 1A through 1C are graphs illustrating received OFDM (orthogonal frequency division multiplexing) signals including noise and channel impulse response (CIR) information.
Figure 1B:
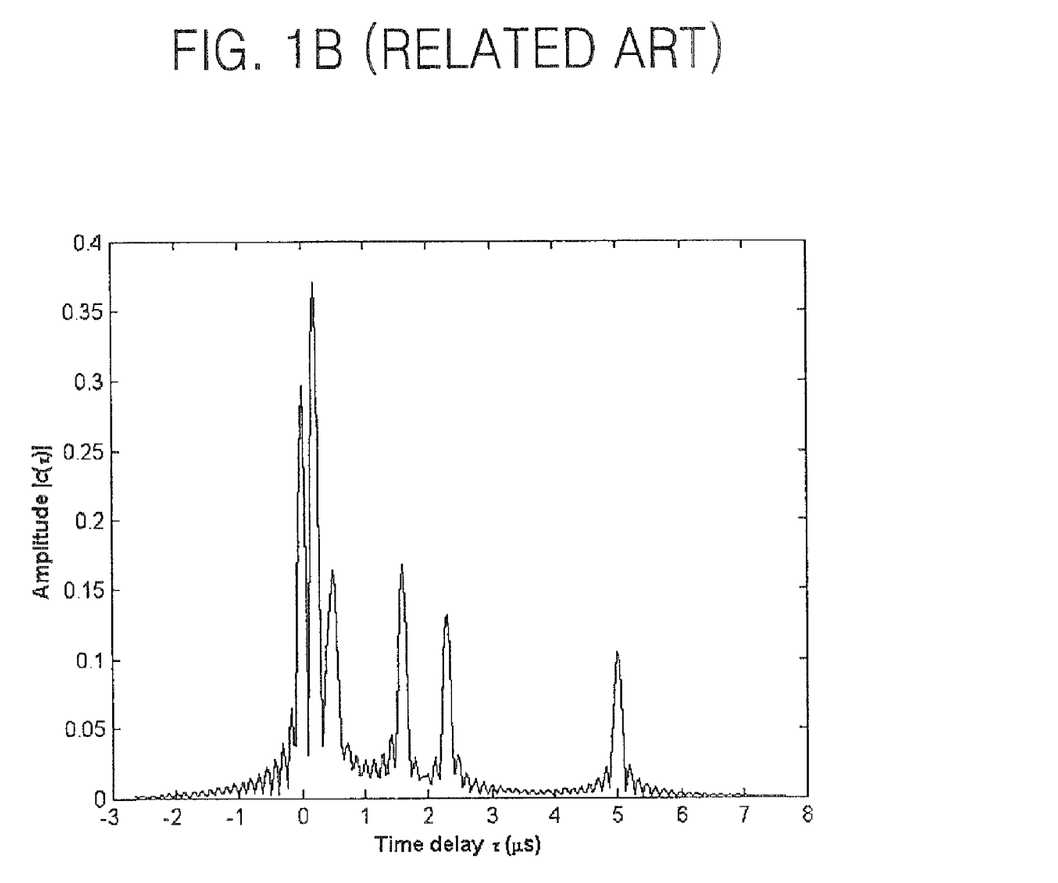
Figure 1C:
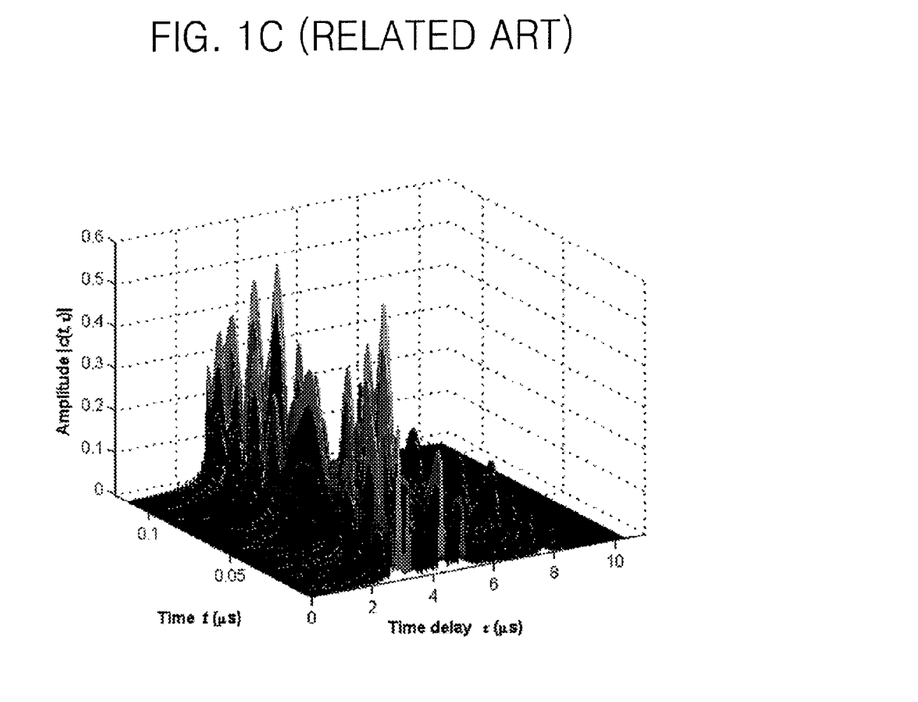

FIGS. 1A through 1C are graphs illustrating received OFDM signals including noise and CIR information. FIG. 1A is a graph illustrating the amplitude of a CIR in a TU6 channel model, which is disclosed in "COST 207 TD(86)51-REW3 (WG1): Proposal on Channel Transfer Functions to be Used in GSM Tests Late 1986, September 1986". Referring to FIG. 1A, six channel paths exist in an exemplary channel (channel model) in terms of continuous time. FIG. 1B illustrates CIRs existing within a time period, during which no pulse exists in the channel model illustrated in FIG. 1A. These CIRs are unwanted CIR components having a low-energy value and are generated due to energy leakage from a period in which pulses exist. FIG. 1C is a graph obtained by observing the CIRs illustrated in FIG. 1B in terms of time variation. It can be determine from the graph that CIRs exist within the period in which no pulse exist in the channel model illustrated in FIG. 1A.

The above-mentioned CIRs being unwanted CIR components having a low-energy value may make it difficult to detect a CIR based on a known transmission signal generated by an OFDM transmitter. For instance, even if the method of threshold detection disclosed in "Z. Yang, J. Wang, C. Pan, et al., "Channel Estimation of DMB-T," in 2002 IEEE Conf. Commu., Circuits and Systems and West Sino Expositions, pp. 1069-1072" is used, CIR detection may be difficult due to an unwanted CIR component, having a low-energy value because of inter-symbol interference (ISI) having a high-energy value and energy leakage in a channel model.

SUMMARY OF THE INVENTION

Various embodiments of the present invention provide a channel estimation method and apparatus in which a channel impulse response (CIR) distribution area is subdivided during CIR estimation and minimizing noise interference and accurately estimating a channel.

According to some embodiments of the present invention, there is provided a channel estimation method including detecting a CIR distribution area by scanning a signal containing noise and CIR information with a first window and a second window adjacent to the first window, by calculating a ratio between an average power of the first window and an average power of the second window, by comparing the calculated average power ratio with at least one threshold value, and by calculating a start point, at which the average power ratio is initially equal to the at least one threshold value, and an end point, at which the average power ratio is lastly equal to the at least one threshold value; and eliminating the noise from the CIR distribution area and estimating the CIR information.

Detecting the CIR distribution area may include scanning the first window and the second window by a predetermined step interval repeatedly and calculating the average power of the first window and the average power of the second window according to corresponding step; calculating a first ratio of the average power of the second window to the average power of the first window and a second ratio of the average power of the first window to the average power of the second window according to the corresponding step; comparing the first ratio with a first threshold value and detecting the start point, at which the first ratio is initially equal to the first threshold value, based on a result of the comparison; and comparing the second ratio with a second threshold value and detecting the end point, at which the second ratio is lastly equal to the second threshold value, based on a result of the comparison.

The first ratio may have characteristics of F distribution, the first threshold value may correspond to a value corresponding to $F_\beta(D_l, D_r)$ in an F distribution table, the second ratio may have the characteristics of the F distribution, the second threshold value may correspond to a value corresponding to $F_\beta(D_r, D_l)$ in the F distribution table, Here, $\beta$ is be a false detection probability, $D_l$ is a length of the first window, and $D_r$ is a length of the second window.

Before detecting the CIR distribution area, the channel estimation method may further include eliminating other noise from the signal, which contains the noise and the CIR information, and estimating the CIR information.

The channel estimation method may be recorded as a program in a computer readable medium.

According to other embodiments of the present invention, there is provided a channel estimation apparatus including a linear correlator configured to receive a baseband sample complex signal and a local pseudo-noise (PN) signal and to generate a correlation signal by calculating a linear correlation between the two signals; and a CIR estimator configured to receive the correlation signal, to eliminate noise from the correlation signal, to perform CIR estimation, and to output a CIR corresponding to a result of the CIR estimation. Here, the CIR estimator scans the correlation signal with a first window and a second window adjacent to the first window, calculates a ratio between an average power of the first window and an average power of the second window, compares the calculated average power ratio with at least one threshold value, and detects a start point, at which the average power ratio is initially equal to the at least one threshold value, and an end point, at which the average power ratio is lastly equal to the at least one threshold value so as to detect a CIR distribution area; eliminates the noise from the CIR distribution area; and estimates the CIR.

The CIR estimator may scan the first window and the second window by a predetermined step interval repeatedly; calculate a first ratio of the average power of the second window to the average power of the first window and a second ratio of the average power of the first window to the average power of the second window according to corresponding step; compare the first ratio with a first threshold value to detect the start point, at which the first ratio is initially equal to the first threshold value, based on a result of the comparison; and compare the second ratio with a second threshold value to detect the end point, at which the second ratio is lastly equal to the second threshold value, based on a result of the comparison.

The first ratio may have characteristics of F distribution, the first threshold value may correspond to a value corresponding to $F_\beta(D_l, D_r)$ in an F distribution table, the second ratio may have the characteristics of the F distribution, the second threshold value may correspond to a value corresponding to $F_\beta(D_r, D_l)$ in the F distribution table. Here, $\beta$ is be a false detection probability, $D_l$ is a length of the first window, and $D_r$ is a length of the second window.

The channel estimation apparatus may further include a PN remover configured to receive the baseband sampled complex signal and the CIR, to eliminate a frame head from the baseband sampled complex signal, to restore cyclic convolution relation between frame body data of the baseband sampled complex signal and a current channel CIR, and to output a restored frame body; a fast Fourier transform unit configured to perform fast Fourier transform of the restored frame body and to output a fast Fourier transformed signal; a discrete Fourier transform unit configured to receive the CIR, to perform discrete Fourier transform of the CIR, and to output a discrete Fourier transformed signal; and a channel equalizer configured to perform channel equalization based on the fast Fourier transformed signal and the discrete Fourier transformed signal and to output an equalized signal.

The channel estimation apparatus may further include a decoder configured to receive the equalized signal output from the channel equalizer, to perform channel decoding on the equalized signal, and to output a decoded signal.

The channel estimation apparatus may be implemented in an orthogonal frequency division multiplexing (OFDM) receiver.

According to further embodiments of the present invention, a channel estimation apparatus includes a channel estimator configured to receive a fast Fourier transformed baseband sampled complex signal and a pilot frequency, to detect a magnitude of the fast Fourier transformed baseband sampled complex signal according to the pilot frequency, and to calculate channel gains corresponding to a result of the detection; an interpolator configured to receive the channel gains, to perform inverse discrete Fourier transform of the channel gains, to scan an inverse discrete Fourier transformed signal with a first window and a second window adjacent to the first window, to calculate a ratio between an average power of the first window and an average power of the second window, to compare the calculated average power ratio with at least one threshold value, to detect a start point, at which the average power ratio is initially equal to the at least one threshold value, and an end point, at which the average power ratio is lastly equal to the at least one threshold value so as to detect a CIR distribution area, to eliminate noise from the CIR distribution area, to estimate CIR information, to perform discrete Fourier transform of the CIR information, and to output a discrete Fourier transformed signal; and a channel equalizer configured to perform channel equalization based on the fast Fourier transformed baseband sampled complex signal and the discrete Fourier transformed signal output from the interpolator and to output an equalized signal.

The interpolator may scan the first window and the second window by a predetermined step interval repeatedly; calculate a first ratio of the average power of the second window to the average power of the first window and a second ratio of the average power of the first window to the average power of the second window according to corresponding step; compare the first ratio with a first threshold value to detect the start point, at which the first ratio is initially equal to the first threshold value, based on a result of the comparison; and compare the second ratio with a second threshold value to detect the end point, at which the second ratio is lastly equal to the second threshold value, based on a result of the comparison.

The first ratio may have characteristics of F distribution, the first threshold value may correspond to a value corresponding to $F_\beta(D_l, D_r)$ in an F distribution tables the second ratio may have the characteristics of the F distribution, the second threshold value may correspond to a value corresponding to $F_\beta(D_r, D_l)$ in the F distribution table. Here, $\beta$ is be a false detection probability, $D_l$ is a length of the first window, and $D_r$ is a length of the second window.

The interpolator may include an inverse discrete Fourier transform unit configured to receive the channel gains, to perform inverse discrete Fourier transform of the channel gains, and to output inverse discrete Fourier transformed signals; a CIR estimator configured to receive the inverse discrete Fourier transformed signals, to eliminate channel noise from the inverse discrete Fourier transformed signals, to perform CIR estimation, and to output a CIR corresponding to a result of the CIR estimation; and a discrete Fourier transform unit configured to receive the estimated CIR, to perform discrete Fourier transform of the CIR, and to output the discrete Fourier transformed signal.

The channel estimation apparatus may further include a fast Fourier transform unit configured to receive a baseband sampled complex signal, to perform fast Fourier transform of the baseband sampled complex signal, and to output the fast Fourier transformed baseband sampled complex signal.

The channel estimation apparatus may further include a decoder configured to receive the equalized signal output from the channel equalizer, to perform channel decoding on the equalized signal, and to output a decoded signal.

The channel estimation apparatus may be implemented in an OFDM receiver.

The present invention will be described more fully hereinafter with reference to the accompanying drawings, in which embodiments of the invention are shown. This invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art.

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

BRIEF DESCRIPTION OF THE DRAWINGS

The above and other features and advantages of the present invention will become more apparent by describing in detail exemplary embodiments thereof with reference to the attached drawings in which like numbers refer to like elements, and.

DETAILED DESCRIPTION OF EXEMPLARY EMBODIMENTS OF THE INVENTION

Figure 2:
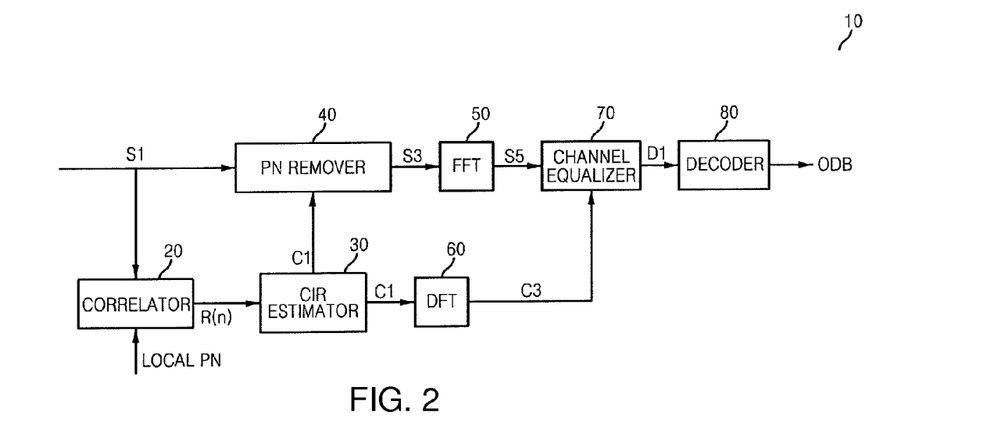
FIG. 2 is a functional block diagram of a channel estimation apparatus in an OFDM receiver, according to an exemplary embodiment of the present invention.
Figure 3:
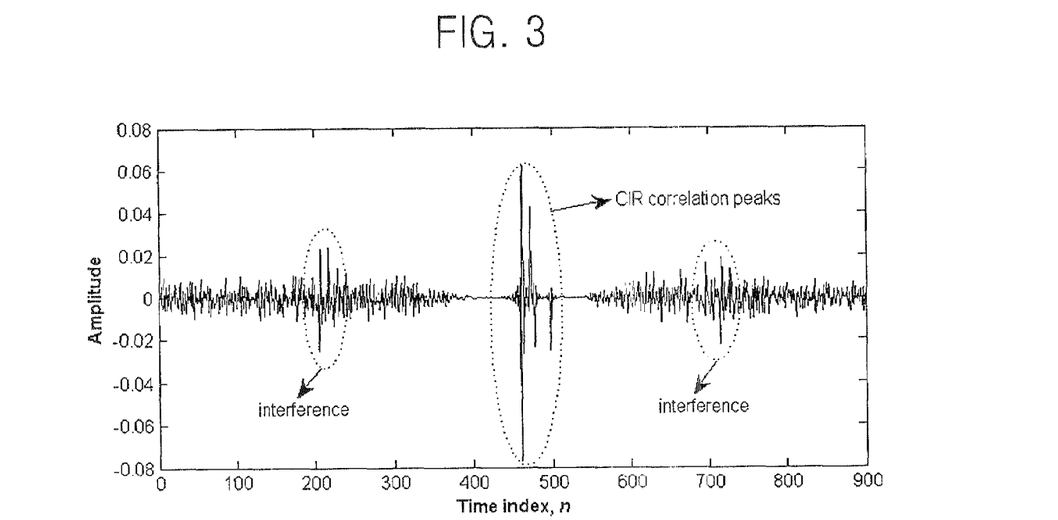
FIG. 3 is a graph illustrating a signal R(n) input into the CIR estimator 30 included in the channel estimation apparatus 10 illustrated in FIG. 2.
Figure 4:
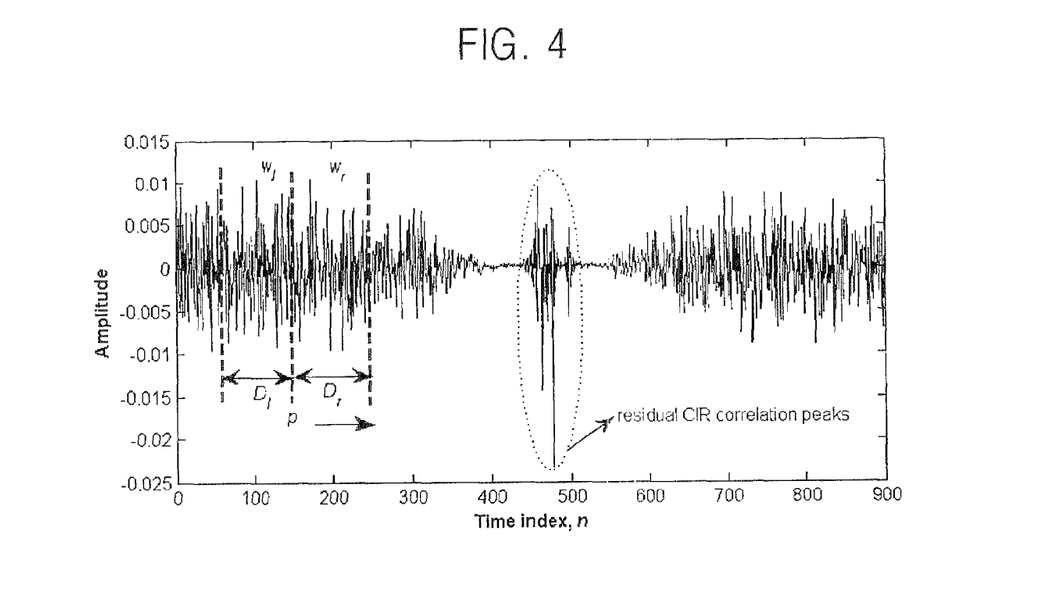
FIG. 4 is a graph illustrating the CIR area detecting operation performed by the CIR estimator 30 included in the channel estimation apparatus 10 illustrated in FIG. 2, according to some embodiments of the present invention.
Figure 5:
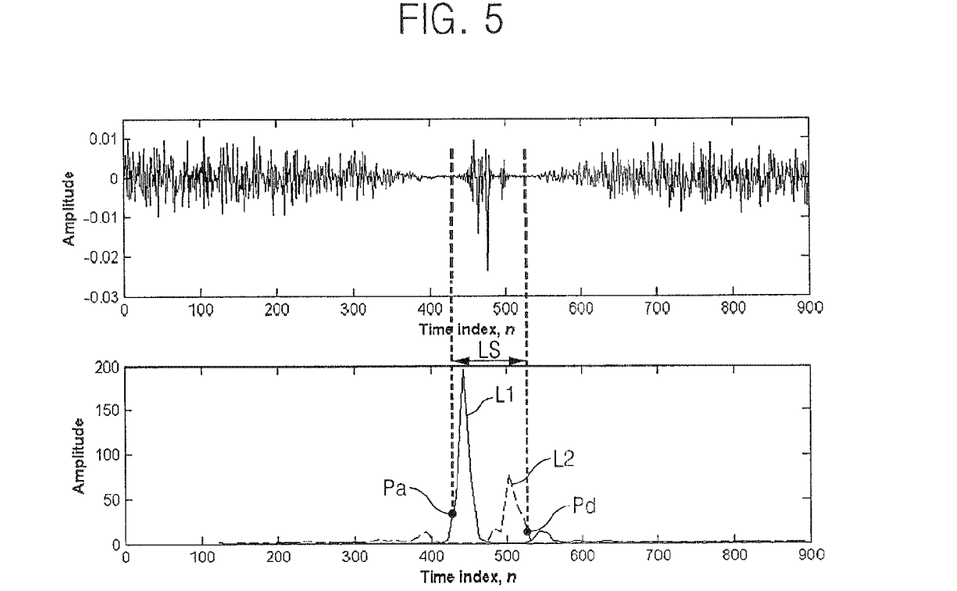
FIG. 5 is a graph illustrating the CIR area detecting operation performed by the CIR estimator 30 included in the channel estimation apparatus 10 illustrated in FIG. 2, according to other embodiments of the present invention.

FIG. 2 is a functional block diagram of a channel estimation apparatus (or of an orthogonal frequency division multiplexing (OFDM) receiver including such a channel estimation apparatus) 10, according to an exemplary embodiment of the present invention. FIG. 3 is a graph illustrating a signal input into the channel impulse response (CIR) estimator 30 included in the channel estimation apparatus 10 illustrated in FIG. 2. FIGS. 4 and 5 are graphs illustrating the CIR area detecting operation performed by the CIR estimator 30 included in the channel estimation apparatus 10 illustrated in FIG. 2, according to alternative embodiments of the present invention.

Referring to FIGS. 2 through 5, a channel estimation apparatus 10 includes a correlator 20, a CIR estimator 30, a pseudo-noise (PN) remover 40, a fast Fourier transform (FFT) unit 50, a discrete Fourier transform (DFT) unit 60, a channel equalizer 70, and a decoder 80. The channel estimation apparatus 10 may be implemented in an OFDM receiver, and particularly, in a time domain synchronous (TDS)-OFDM receiver.

The correlator 20 receives a baseband sampled complex signal S1 and a locally stored PN signal and calculates the correlation between the two signals so as to generate a correlation signal R(n). Since a frame head of the baseband sampled complex signal S1 is known PN data for use in the channel estimation apparatus 10, the baseband sampled complex signal S1 is correlated with the locally stored PN signal. This correlation may be linear correlation or cyclic correlation and the correlation signal R(n) may include noise (e.g., correlation noise).

The CIR estimator 30 receives the correlation signal R(n), eliminates noise from the correlation signal R(n), estimates a CIR, and outputs a first CIR (C1) corresponding to the estimation result. The first CIR (C1) is a noise-eliminated CIR signal. The CIR estimator 30 estimates the CIR based on two adjacent windows.

Referring to FIG. 3, in addition to a CIR correlation peak (CCP) which includes CIR information, noise like white Gaussian noise (i.e., interference) is included in the correlation signal R(n). In order to detect a CIR distribution area from the correlation signal R(n), the CIR estimator 30 sets a first window $W_l$ and a second window $W_r$ adjacent to the first window $W_l$, as illustrated in FIG. 4, continuously shifts (hereinafter, referred to as "scans") the first window $W_l$ and the second window $W_r$ by a predetermined step (time interval) with respect to the correlation signal R(n), and calculates the ratio between average power of the first window $W_l$ and the average power of the second window $W_r$. The predetermined step (time interval) is a scan interval at which the first window $W_l$ and the second window $W_r$ are scanned along the time axis, i.e., the time index in FIG. 4.

When the average power of the first window $W_l$ is represented by $E_l(p)$ and the average power of the second window $W_r$ is represented by $E_r(p)$, $E_l(p)$ and $E_r(p)$ can be calculated using Equation (1):

$$E_l(p) = \frac{1}{D_l} \left| \sum_{n=p-D_l}^{p-1} R(n)^2 \right| \quad (1)$$

$$E_r(p) = \frac{1}{D_r} \left| \sum_{n=p}^{p+D_p-1} R(n)^2 \right|,$$

where p is a border value between the first window $W_l$ and the second window $W_r$, $D_l$ is the length of the first window $W_l$, and $D_r$ is the length of the second window $W_r$. For instance, scanning is performed by repeatedly adding the predetermined step interval (e.g., 10 time units) to the border value p and the CIR estimator 30 calculates the ratio (average power ratio) between the average power of the first window $W_l$ and the average power of the second window $W_r$ each time when the predetermined step interval is added.

The CIR estimator 30 compares the calculated average power ratio with at least one threshold value, detects a start point Pa at which time the average power ratio is initially equal to the at least one threshold value and an end point Pd, at which time the average power ratio is last equal to the at least one threshold value so as to detect a CIR distribution area LS, eliminates the noises i.e., interference in the CIR distribution LS, and estimates the CIR.

One threshold value or two different threshold values may be used. For instance, the CIR estimator 30 scans the first window $W_l$ and the second window $W_r$ by the predetermined step interval and calculates a first ratio L1 (of the average power of the second window $W_r$ to the average power of the first window $W_l$) and a second ratio L2 (of the average power of the first window $W_l$ to the average power of the second window $W_r$). Thereafter, the CIR estimator 30 compares the first ratio L1 with a first threshold value (not shown) and detects the start point Pa, at which the first ratio L1 is initially equal to the first threshold value. In addition, the CIR estimator 30 compares the second ratio L2 with a second threshold value (not shown) and detects the end point Pd, at which the second ratio L2 is lastly equal to the second threshold value.

The first ratio L1 may have the characteristics of the F distribution and the first threshold value may correspond to a value corresponding to $F_\beta(D_l, D_r)$ in an F distribution table. In addition, the second ratio L2 may have the characteristics of the F distribution and the second threshold value may correspond to a value corresponding to $F_\beta(D_r, D_l)$ in the F distribution table. Here, β is a false detection probability. The characteristics of the F distribution and the F distribution table are disclosed in "J. S. Milton and J. C. Arnold, "Introduction to Probability and Statistics: Principles and Applications for Engineering and the Computer Sciences," 4th ed., New York, McGraw-Hill, 2000".

The CIR estimator 30 may eliminate the interference included within the CIR distribution area LS using a threshold detection method and estimate the CIR C1. For instance, the CIR estimator 30 sets a threshold value having a magnitude corresponding to 1/m or 1/n (where each of "m" and "n" are a natural number, e.g., 4) of the magnitude of the CCP including the CIR information in the detected CIR distribution area LS. The CIR estimator 30 detects signals having a magnitude greater than the threshold value, and eliminates the detected signals from the correlation signal R(n), thereby eliminating the interference.

According to some embodiments of the present invention, before estimating the CIR information, the CIR estimator 30 narrows a range subjected to the threshold detection by setting the CIR distribution area LS and eliminates the interference from the CIR distribution area LS, so that false detection of the CIR information can be prevented.

The CIR estimator 30 eliminates noise using the threshold detection method and then estimates the CIR information. Thereafter, the CIR estimator 30 sets the CIR distribution area LS using the two adjacent windows, eliminates interference using the threshold detection method again, and estimates the CIR C1. In this manner, noise that may be included in the CIR C1 can be completely eliminated.

The PN remover 40 receives the baseband sampled complex signal S1 and the CIR C1, eliminates the frame head (PN data) from the baseband sampled complex signal S1, restores the cyclic convolution relation between frame body data of the baseband sampled complex signal S1 and a current channel CIR, and outputs a restored frame body S3.

The FFT unit 50 performs FFT of the restored frame body S3 and outputs a fast Fourier transformed (FFT'ed) signal S5. The DFT unit 60 receives the CIR C1 and performs DFT of the CIR C1 so as to output a discrete Fourier transformed (DFT'ed) signal C3. The channel equalizer 70 performs channel equalization based on the FFT'ed signal S5 and the DFT'ed signal C3 and outputs an equalized signal D1. The decoder 80 may be referred to as a forward error control (FEC) device. The decoder 80 receives the equalized signal D1 output from the channel equalizer 70 and performs channel decoding on it so as to output a decoded signal (i.e., an output decoded bit stream, ODB).

Figure 6:
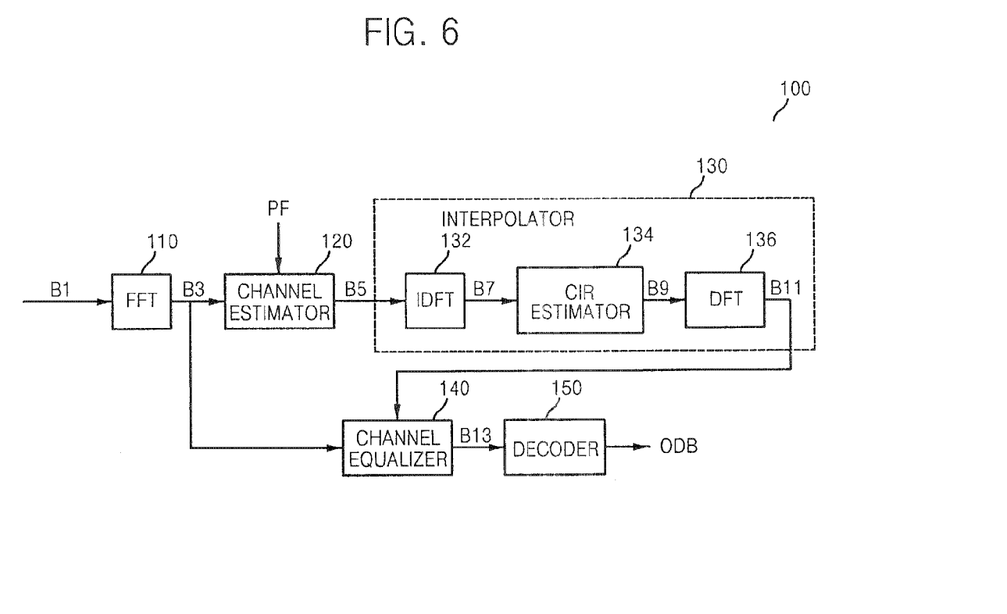
FIG. 6 is a functional block diagram of a channel estimation apparatus 100, according to another embodiment of the present invention.

FIG. 6 is a functional block diagram of a channel estimation apparatus (or an OFDM receiver including the channel estimation apparatus) 100, according to another embodiment of the present invention. Referring to FIG. 6, the channel estimation apparatus 100 includes an FFT unit 110, a channel estimator 120, an interpolator 130, a channel equalizer 140, and a decoder 150. The channel estimation apparatus 100 may be implemented in an OFDM receiver or in a CP-OFDM receiver.

The FFT unit 110 receives a baseband sampled complex signal B1 and performs FFT of it so as to output an FFT'ed signal B3. The channel estimator 120 detects the magnitude of the FFT'ed baseband sampled complex signal B3 according to a pilot frequency PF and calculates channel gains B5 corresponding to a result of the detection. Each of the channel gains B5 may be calculated using a least square (LS) method or a minimum mean-square error (MMSE) method.

The interpolator 130 receives the channel gains B5, performs inverse DFT (IDFT) of them, eliminates noise from an inverse discrete Fourier transformed (IDFT'ed) signal B7 based on two adjacent windows, estimates a noise-eliminated CIR signal, i.e., a CIR B9, and performs DFT of the CIR B9 so as to output a DFT'ed signal B11. The interpolator 130 includes an IDFT unit 132, a CIR estimator 134, and a DFT unit 136.

The IDFT unit 132 receives the channel gains B5 and performs IDFT of them so as to output the IDTF'ed signal B7. The CIR estimator 134 receives the IDFT'ed signal B7, eliminates noise from the IDFT'ed signal B7, performs CIR estimation, and outputs the CIR B9 corresponding to a result of the CIR estimation.

The channel noise elimination and the CIR estimation are performed by channel estimation (134) based on two adjacent windows, which has been described above with reference to the CIR estimator 30 shown in FIG. 2. The CIR estimator 134 has almost the same functions as the CIR estimator 30 shown in FIG. 2, with the exception that the CIR estimator 134 performs channel noise elimination and CIR estimation based on the IDFT'ed signal B7 instead of the correlation signal R(n) and outputs the CIR B9 corresponding to a result of the CIR estimation. Thus, a detailed description thereof will be omitted.

The DFT unit 136 receives the CIR B9 and performs DFT of it so as to output the DFT ed signal B11.

The channel equalizer 140 performs channel equalization based on the FFT'ed baseband sampled complex signal B3 and the DFT'ed signal B11 and outputs an equalized signal B13. The decoder 150 receives the equalized signal B13 output from the channel equalizer 140 and performs channel decoding on the equalized signal B13 so as to output an ODB signal.

Figure 7:
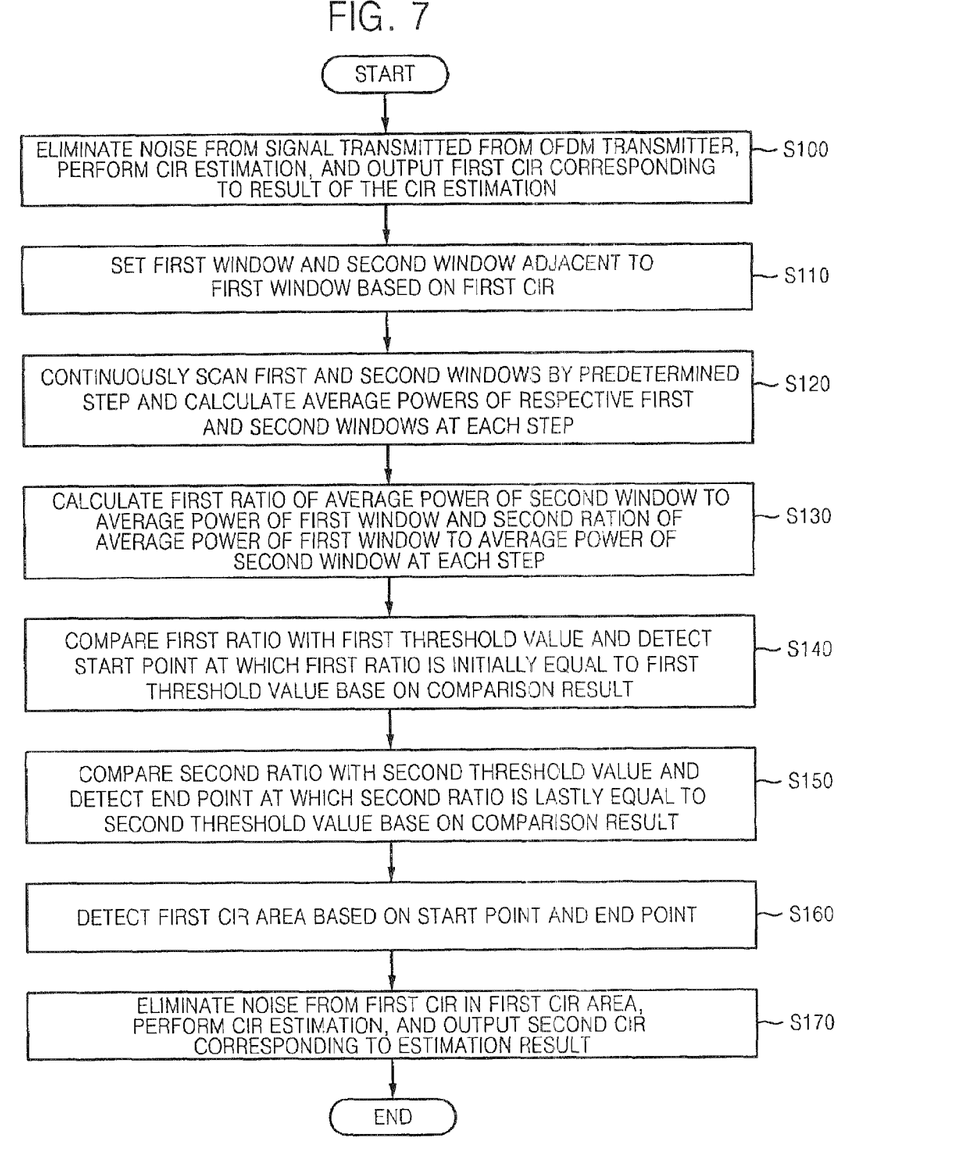
FIG. 7 is a flowchart of a channel estimation method according to some embodiments of the present invention.

FIG. 7 is a flowchart of a channel estimation method according to some embodiments of the present invention, Referring to FIGS. 2 through 7, in step S100, the CIR estimator 30 or 134 eliminates noise from the correlation signal R(n) generated by the correlator 20 illustrated in FIG. 2 or from the IDFT'ed signal B7 generated by the IDFT unit 132, performs CIR estimation, and outputs a first CIR corresponding to a result of the CIR estimation. In step S110, the CIR estimator 30 (FIG. 2) or 134 (FIG. 6) sets the first window W and the second window $W_r$ (adjacent to the first window $W_l$) based on the first CIR. In step S120, the CIR estimator 30 or 134 continuously scans the first window $W_l$ and the second window $W_r$ by a predetermined step interval and calculates the average power of the first window $W_l$ and the average power of the second window $W_r$ according to the corresponding step interval. In step S130, the CIR estimator 30 or 134 calculates the first ratio L1 (ratio of the average power of the second window $W_r$ to the average power of the first window $W_l$) and the second ratio L2 (ratio of the average power of the first window $W_l$ to the average power of the second window $W_r$). In step S140, the CIR estimator 30 or 134 compares the first ratio L1 with a first threshold value, and detects the start point Pa at which the first ratio L1 is initially equal to the first threshold value based on a result of the comparison. In step S150, the CIR estimator 30 or 134 compares the second ratio L2 with a second threshold value, and detects the end point Pd at which the second ratio L2 is last equal to the second threshold value based on a result of the comparison. In step S160, the CIR estimator 30 or 134 detects or calculates the CIR distribution area LS based on the start point Pa and the end point Pd. In step S170, the CIR estimator 30 or 134 eliminates noise from the first CIR and performs CIR estimation, with respect to the CIR distribution area LS, so as to output a second CIR.

In other words, after first CIR estimation, CIR estimation is more finely performed by scanning the first window $W_l$ and the second window $W_r$ so that noise interference can be minimized and accurate channel estimation can be accomplished.

Figure 8:
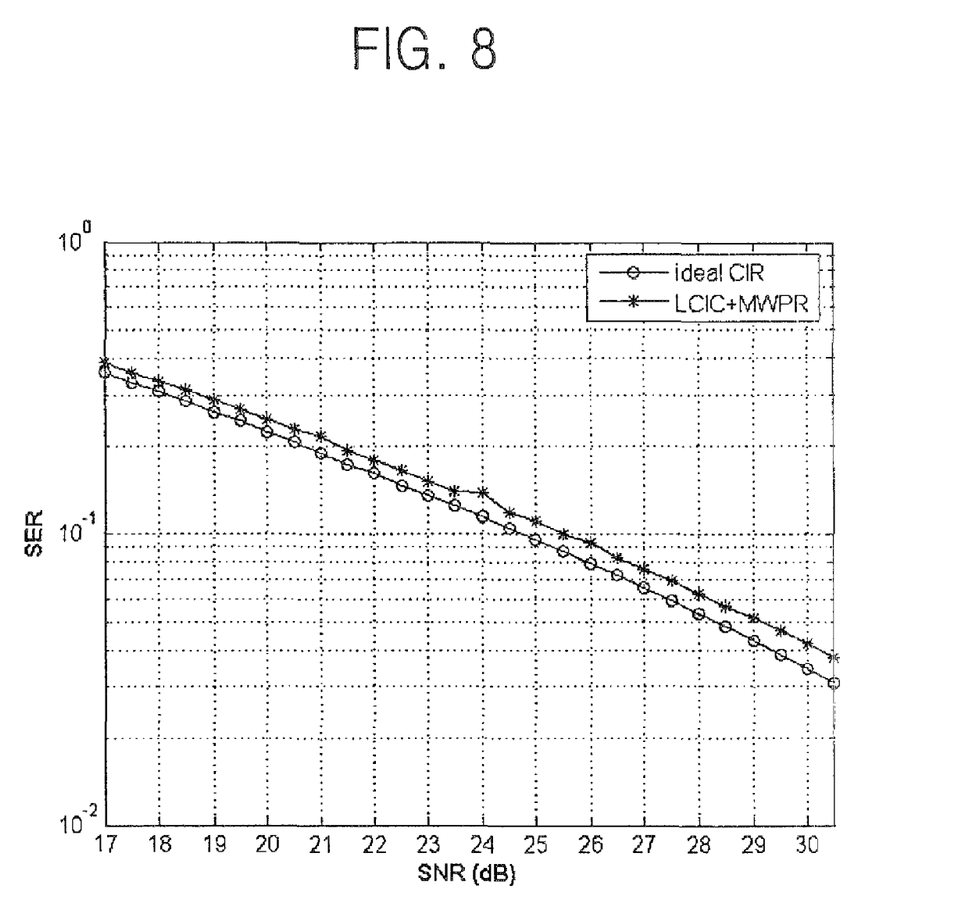
FIG. 8 is a graph illustrating a symbol error rate (SER) resulting from a channel estimation method, according to some embodiments of the present invention.
Figure 9:
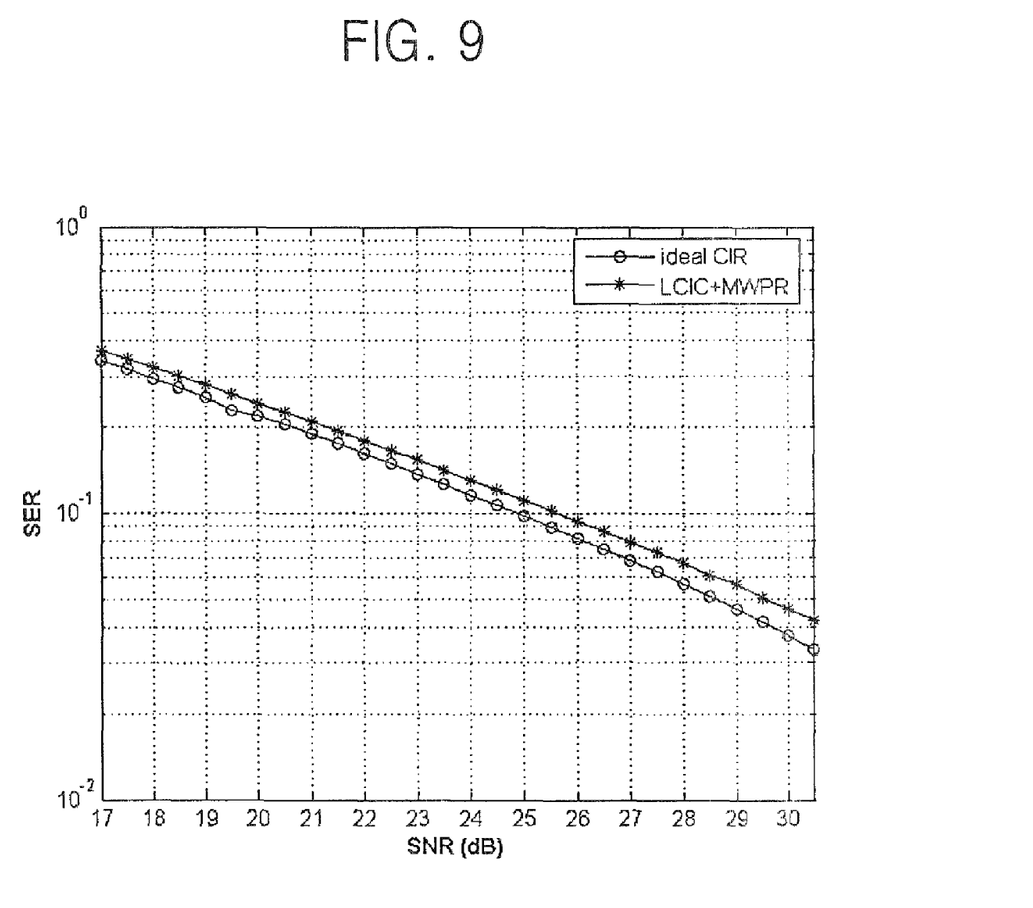
FIG. 9 is a graph illustrating an SER resulting from a channel estimation method, according to other embodiments of the present invention.

FIGS. 8 and 9 are graphs illustrating a measured symbol error rate (SER) resulting from a channel estimation method according to an embodiment of the present invention. FIG. 8 illustrates the result of simulating a fixed reception F1 version of a digital video broadcasting (DVB)-T channel model, which is disclosed in "DVB: Frame Structure Channel Coding and Modulation for Digital Terrestrial Television. ETSI, Tech. Rep. EN300 744 v1.1.2. August 1997", on the conditions that both of the length $D_l$ of the first window $W_l$ and the length $D_r$ of the second window $W_r$ were 25, the start point Pa and the end point Pd of the CIR distribution area were 6, the length LS of the CIR distribution area was 120, a step size was 10, and the false detection probability β was 0.1%. Referring to FIG. 8, a measured SER indicated by LCIC+MWPR obtained when a channel estimation method according to some embodiment of the present invention was used, is almost identical to that calculated for an ideal CIR. Accordingly, it can be inferred that an symbol error rate can be reduced in an actual OFDM system performing a channel estimation method according to an embodiment of the present invention.

FIG. 9 illustrates the SER resulting from the disclosed channel estimation method, in a simulated TU6 channel models which is disclosed in "COST 207 TD(86)51-REW 3(WG1); Proposal on Channel Transfer Functions to be Used in GSM Tests Late 1986, September 1986", under the same conditions as in the simulation described in FIG. 8. Referring to FIG. 9, a measured SER, which is indicated by LCIC+MWPR obtained when a channel estimation method according to some embodiment of the present invention is used, is almost identical to that obtained in an ideal CIR. Accordingly, it can be inferred that an error rate can be reduced in an actual OFDM system performing a channel estimation method according to an embodiment of the present invention.

Embodiments of the invention can also be implemented as computer readable codes on a computer readable recording medium. The computer readable recording medium may be any data storage device that can store data which can thereafter be read (and executed) by a computer system. The computer readable recording medium can also be distributed over network coupled computer systems so that the computer readable code is stored and executed in a distributed fashion. Also, functional programs codes and code segments for accomplishing the method of the present invention can be easily constructed by programmers skilled in the art to which the present invention pertains.

As described above, according to some embodiments of the present invention, a CIR distribution area is subdivided (dynamically during CIR estimation) and noise interference is minimized, so that accurate channel estimation can be accomplished.

While the present invention has been shown and described with reference to exemplary embodiments thereof, it will be understood by those of ordinary skill in the art that various changes in form and detail may be made herein without departing from the spirit and scope of the present invention, as defined by the following claims.

What is claimed is:

1. A channel estimation method comprising:
   detecting a channel impulse response (CIR) distribution area by a CIR estimator scanning a signal containing noise and CIR information with a first window and a second window;
   wherein the second window is adjacent to the first window and wherein detecting the CIR distribution area further comprises:
      calculating by the CIR estimator a average power of the signal within the first window and a average power of the signal within the second window;
      determining by the CIR estimator a start point of the channel impulse response (CIR) distribution area using the average power of the signal within the first window and the average power of the signal within the second window; and
      determining by the CIR estimator an end point of the channel impulse response (CIR) distribution area using the average power of the signal within the first window and the average power of the signal within the second window.

2. The channel estimation method of claim 1, wherein detecting the CIR distribution area further comprises:
calculating the ratio between the average power of the signal within the first window and the average power of the signal within the second window;
comparing the ratio of calculated averages with at least one threshold value; and
determining the start point as the point at which the average power ratio is initially equal to the at least one threshold value;
determining the end point as the point at which the average power ratio is lastly equal to the at least one threshold value.

3. The channel estimation method of claim 2, wherein detecting the CIR distribution area comprises:
scanning the first window and the second window by a predetermined step interval repeatedly and calculating the average power of the signal within the first window and the average power of the signal within the second window;
calculating a first ratio of the average power of the signal within the second window to the average power of the signal within the first window;
calculating a second ratio of the average power of the signal within the first window to the average power of the signal within the second window;
detecting the start point by comparing the first ratio with a first threshold value and; and
detecting the end point by comparing the second ratio with a second threshold value.

4. The channel estimation method of claim 3, wherein the first ratio has characteristics of F distribution, the first threshold value corresponds to a value corresponding to $F_\beta(D_l, D_r)$ in an F distribution table,
wherein the second ratio has the characteristics of the F distribution, the second threshold value corresponds to a value corresponding to $F_\beta(D_r, D_l)$ in the F distribution table, $\beta$ is a false detection probability, $D_l$ is a length of the first window, and $D_r$ is a length of the second window.

5. The channel estimation method of claim 2, further comprising, after detecting the CIR distribution area, eliminating the noise from the CIR distribution area and estimating the CIR information.

6. The channel estimation method of claim 2, further comprising, before detecting the CIR distribution area, eliminating other noise from the signal and estimating the CIR information.

7. A computer readable recording medium for recording a program for executing the channel estimation method of claim 1.

8. A channel estimation apparatus comprising:
a linear correlator configured to receive a baseband sampled complex signal and a locally stored pseudo-noise (PN) signal and to generate a correlation signal by calculating a linear correlation between received signals; and
a channel impulse response (CIR) estimator configured to receive the correlation signal, to eliminate noise from the correlation signal, to perform CIR estimation, and to output a CIR corresponding to a result of the CIR estimation;
wherein the CIR estimator:
scans the correlation signal with a first window and a second window adjacent to the first window,
calculates the average power of the signal within the first window and the average power of the signal within the second window;
determines a start point of a channel impulse response (CIR) distribution area using the average power of the signal within the first window and the average power of the signal within the second window; and
determines an end point of the channel impulse response (CIR) distribution area using the average power of the signal within the first window and the average power of the signal within the second window.

9. The channel estimation apparatus of claim 8, wherein the CIR estimator:
calculates a ratio between an average power of the first window and an average power of the second window, compares the calculated average power ratio with at least one threshold value, and detects a start point, at which the average power ratio is initially equal to the at least one threshold value, and an end point, at which the average power ratio is lastly equal to the at least one threshold value so as to detect the CIR distribution area;
eliminates the noise from the CIR distribution area; and
estimates the CIR.

10. The channel estimation apparatus of claim 8, wherein the CIR estimator:
scans the first window and the second window shifted by a predetermined step interval repeatedly;
calculates a first ratio of the average power of the second window to the average power of the first window and a second ratio of the average power of the first window to the average power of the second window;
compares the first ratio with a first threshold value to detect the start point at which the first ratio is initially equal to the first threshold value; and
compares the second ratio with a second threshold value to detect the end point, at which the second ratio is lastly equal to the second threshold value.

11. The channel estimation apparatus of claim 10, wherein the first ratio has characteristics of F distribution, the first threshold value corresponds to a value corresponding to $F_\beta(D_l, D_r)$ in an F distribution table, the second ratio has the characteristics of the F distribution, the second threshold value corresponds to a value corresponding to $F_\beta(D_r, D_l)$ in the F distribution table, $\beta$ is a false detection probability, $D_l$ is a length of the first window, and $D_r$ is a length of the second window.

12. The channel estimation apparatus of claim 8, further comprising:
a PN remover configured to receive the baseband sampled complex signal and the CIR, to eliminate a frame head from the baseband sampled complex signal, to restore cyclic convolution relation between frame body data of the baseband sampled complex signal and a current channel CIR, and to output a restored frame body;
a fast Fourier transform unit configured to perform fast Fourier transform of the restored frame body and to output a fast Fourier transformed signal;
a discrete Fourier transform unit configured to receive the CIR, to perform discrete Fourier transform of the CIR, and to output a discrete Fourier transformed signal; and
a channel equalizer configured to perform channel equalization based on the fast Fourier transformed signal and the discrete Fourier transformed signal and to output an equalized signal.

13. The channel estimation apparatus of claim 8, further comprising a decoder configured to receive the equalized signal output from the channel equalizer, to perform channel decoding on the equalized signal, and to output a decoded signal.

14. The channel estimation apparatus of claim 8, wherein the channel estimation apparatus is implemented in an orthogonal frequency division multiplexing (OFDM) receiver.

15. A channel estimation apparatus comprising:
a channel estimator configured to:
  receive a fast Fourier transformed baseband sampled complex signal and a pilot frequency;
  detect a magnitude of the fast Fourier transformed baseband sampled complex signal according to the pilot frequency; and
  calculate channel gains corresponding to a result of the detection;
an interpolator configured to:
  receive the channel gains;
  perform inverse discrete Fourier transform of the channel gains;
  scan an inverse discrete Fourier transformed signal within a first window and within a second window adjacent to the first window; and
  calculate the average power of the signal within the first window and the average power of the signal within the second window;
  detect a start point and an end point of a channel impulse response (CIR) distribution area based on the average power of the signal within the first window and the average power of the signal within the second window;
  eliminate noise from the CIR distribution area;
  estimate CIR information within the channel impulse response (CIR) distribution area;
  perform discrete Fourier transform of the CIR information, and
  output a discrete Fourier transformed signal; and
a channel equalizer configured to perform channel equalization based on the fast Fourier transformed baseband sampled complex signal and the discrete Fourier transformed signal output from the interpolator and to output an equalized signal.

16. The channel estimation apparatus of claim 15, wherein the interpolator is configured to detect the start point of the channel impulse response (CIR) distribution area by:
  calculating the ratio between the average power of the signal within the first window and the average power of the signal within the second window;
  comparing calculated ratio with at least one threshold value;
  and determining the start point as the point at which the average power ratio is initially equal to the at least one threshold value.

17. The channel estimation apparatus of claim 15, wherein the interpolator is configured detect the end point of the channel impulse response (CIR) distribution area by:
  calculating the ratio between the average power of the signal within the first window and the average power of the signal within the second window;
  comparing calculated ratio with at least one threshold value; and
  determining the end point as the point at which the average power ratio is lastly equal to the at least one threshold value.

18. The channel estimation apparatus of claim 15, wherein the interpolator:
  scans the first window and the second window by a predetermined step interval repeatedly;
  calculates a first ratio of the average power of the signal within the second window to the average power of the signal within the first window and a second ratio of the average power of the signal within the first window to the average power of the signal within the second window;
  compares the first ratio with a first threshold value to detect the start point as the point at which the first ratio is initially equal to the first threshold value; and
  compares the second ratio with a second threshold value to detect the end point as the point at which the second ratio is lastly equal to the second threshold value.

19. The channel estimation apparatus of claim 18, wherein the first ratio has characteristics of F distribution, the first threshold value corresponds to a value corresponding to $F_\beta(D_l, D_r)$ in an F distribution table, the second ratio has the characteristics of the F distribution, the second threshold value corresponds to a value corresponding to $F_\beta(D_r, D_l)$ in the F distribution table, $\beta$ is a false detection probability, $D_l$ is a length of the first window, and $D_r$ is a length of the second window.

20. The channel estimation apparatus of claim 15, wherein the interpolator comprises:
  an inverse discrete Fourier transform unit configured to receive the channel gains, to perform inverse discrete Fourier transform of the channel gains, and to output inverse discrete Fourier transformed signals;
  a CIR estimator configured to receive the inverse discrete Fourier transformed signals, to eliminate channel noise from the inverse discrete Fourier transformed signals, to perform CIR estimation, and to output a CIR corresponding to a result of the CIR estimation; and
  a discrete Fourier transform unit configured to receive the estimated CIR, to perform discrete Fourier transform of the CIR, and to output the discrete Fourier transformed signal.

21. The channel estimation apparatus of claim 15, wherein the channel estimation apparatus is implemented in an orthogonal frequency division multiplexing (OFDM) receiver.

* * * * *